Figure 1:
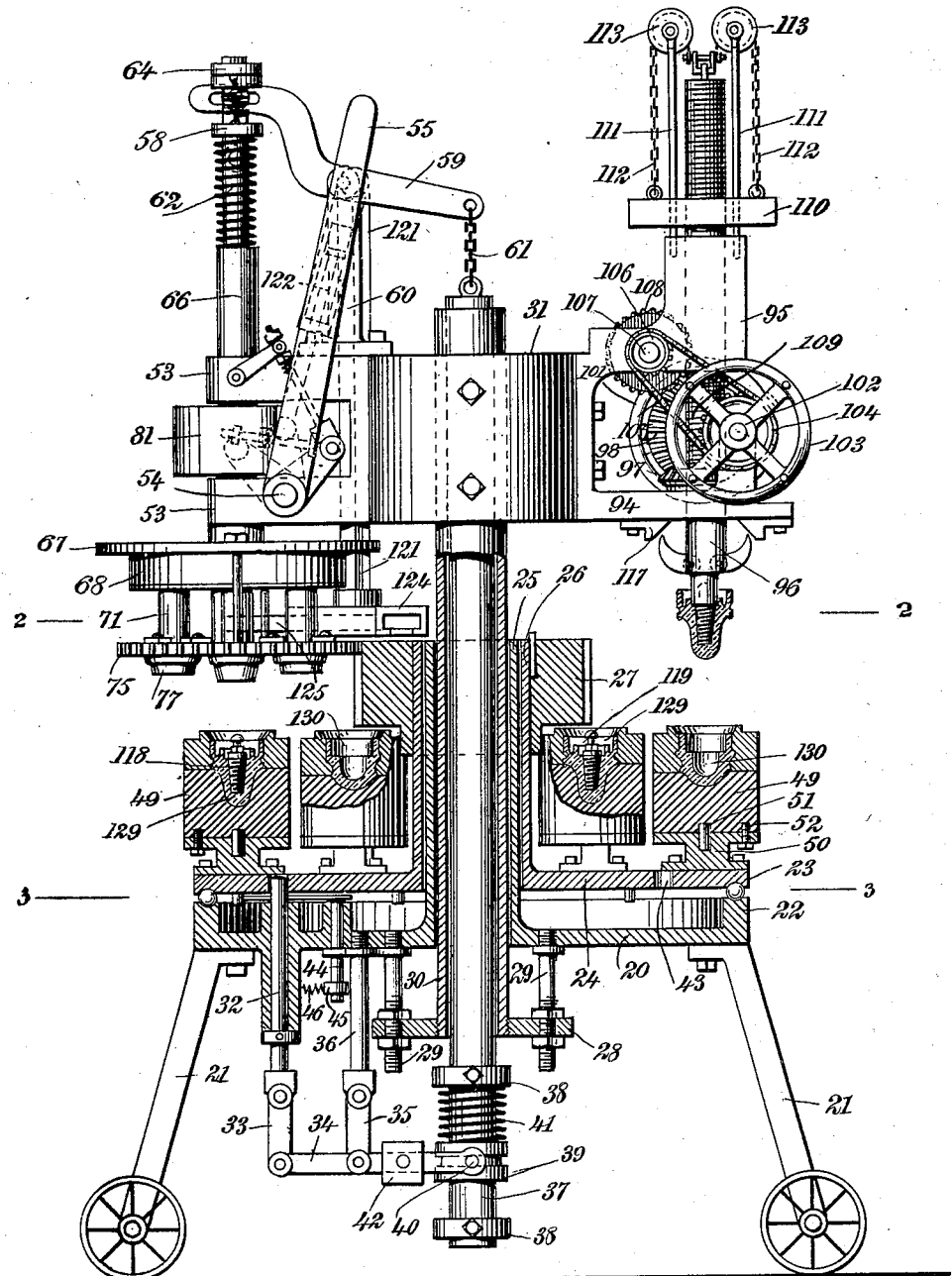

No. 730,665. PATENTED JUNE 9, 1903.
S. KRIBS.
GLASS MOLDING MACHINE.
APPLICATION FILED AUG. 23, 1902
NO MODEL. 6 SHEETS—SHEET 1.

WITNESSES: INVENTOR
Seraphin Kribs
BY
ATTORNEYS.

No. 730,665. PATENTED JUNE 9, 1903.
S. KRIBS.
GLASS MOLDING MACHINE.
APPLICATION FILED AUG. 23, 1902.
NO MODEL. 6 SHEETS—SHEET 2.

WITNESSES:
INVENTOR
Seraphin Kribs
BY
ATTORNEYS.

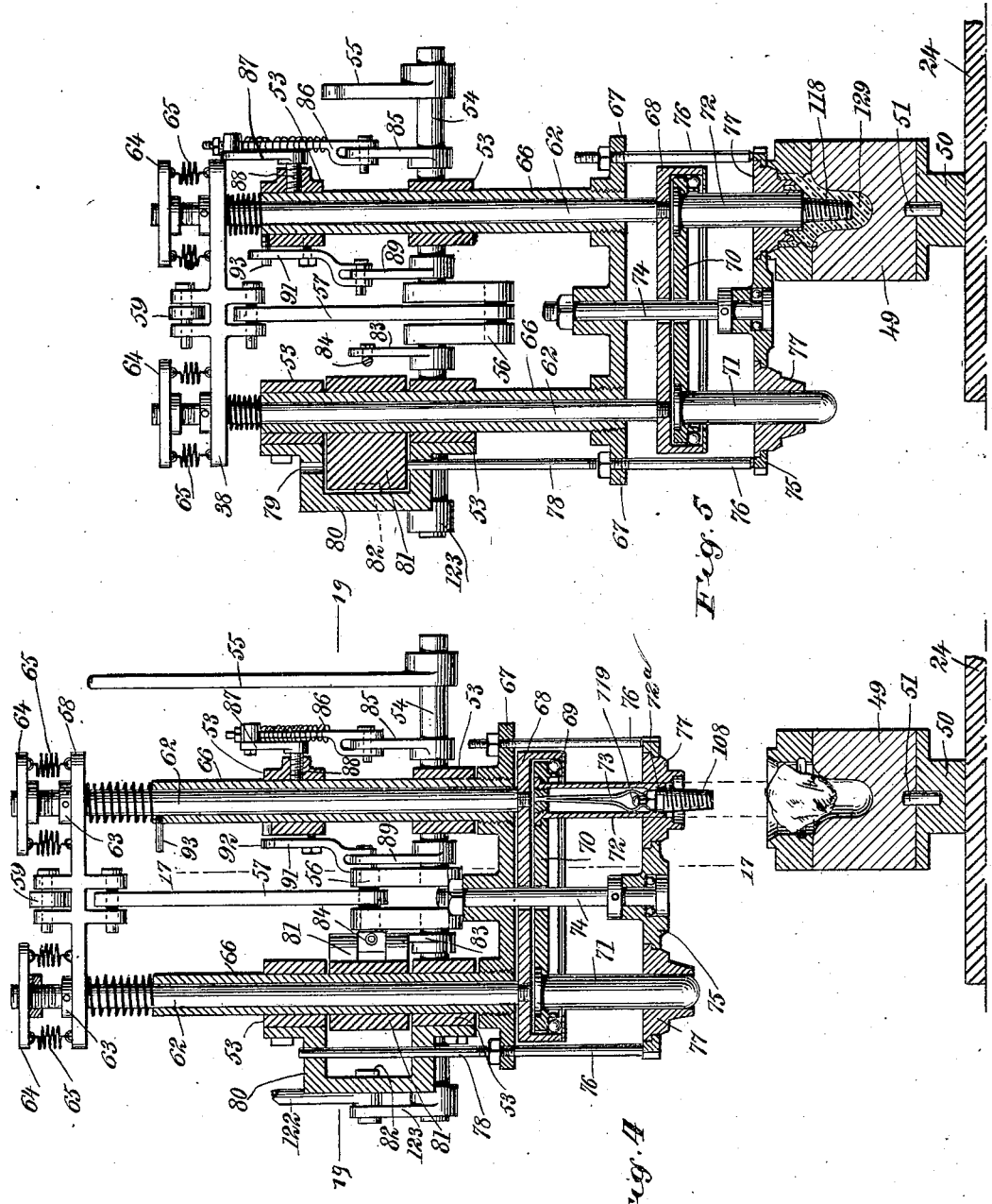

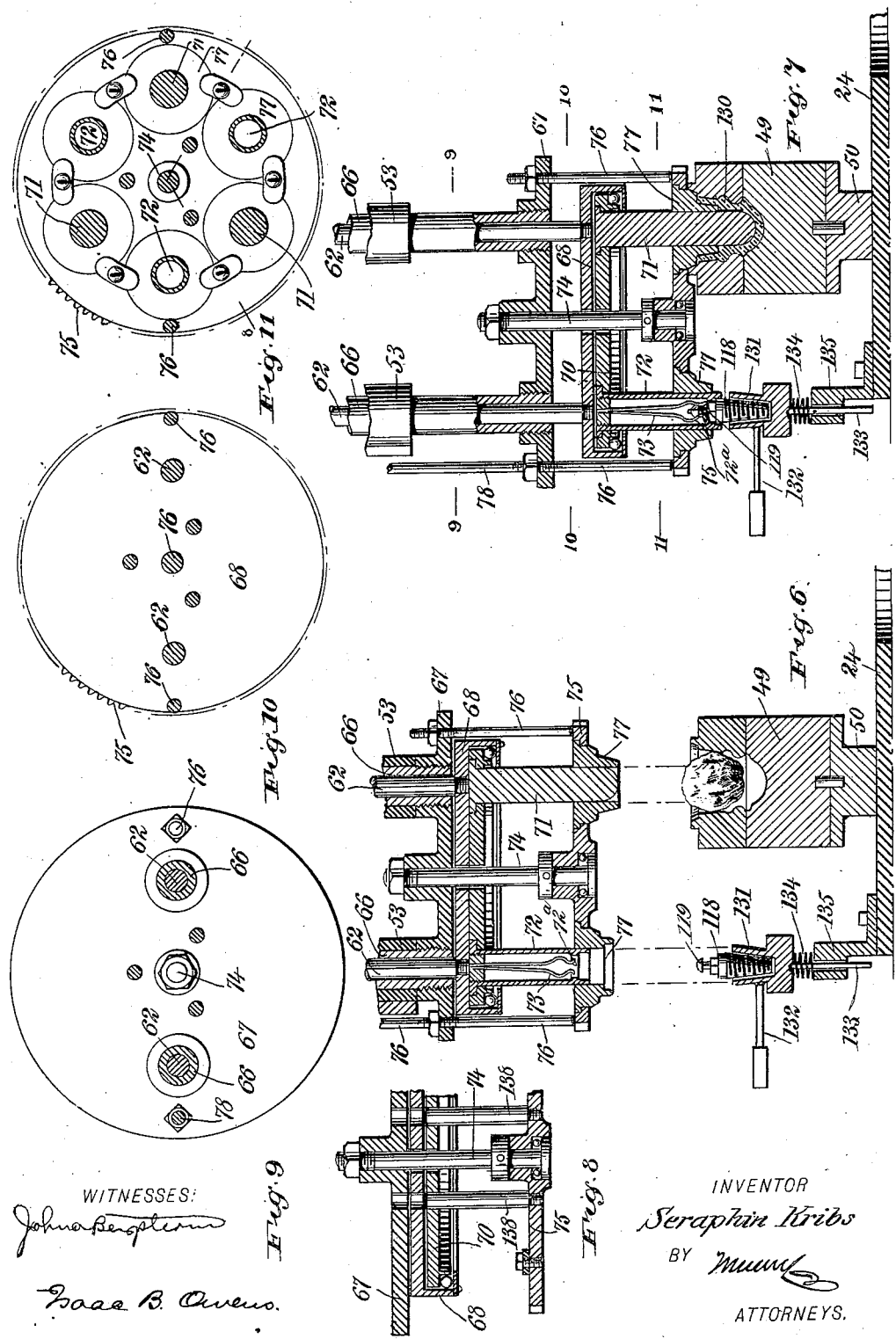

No. 730,665. PATENTED JUNE 9, 1903.
S. KRIBS.
GLASS MOLDING MACHINE.
APPLICATION FILED AUG. 23, 1902.
NO MODEL. 6 SHEETS—SHEET 5.
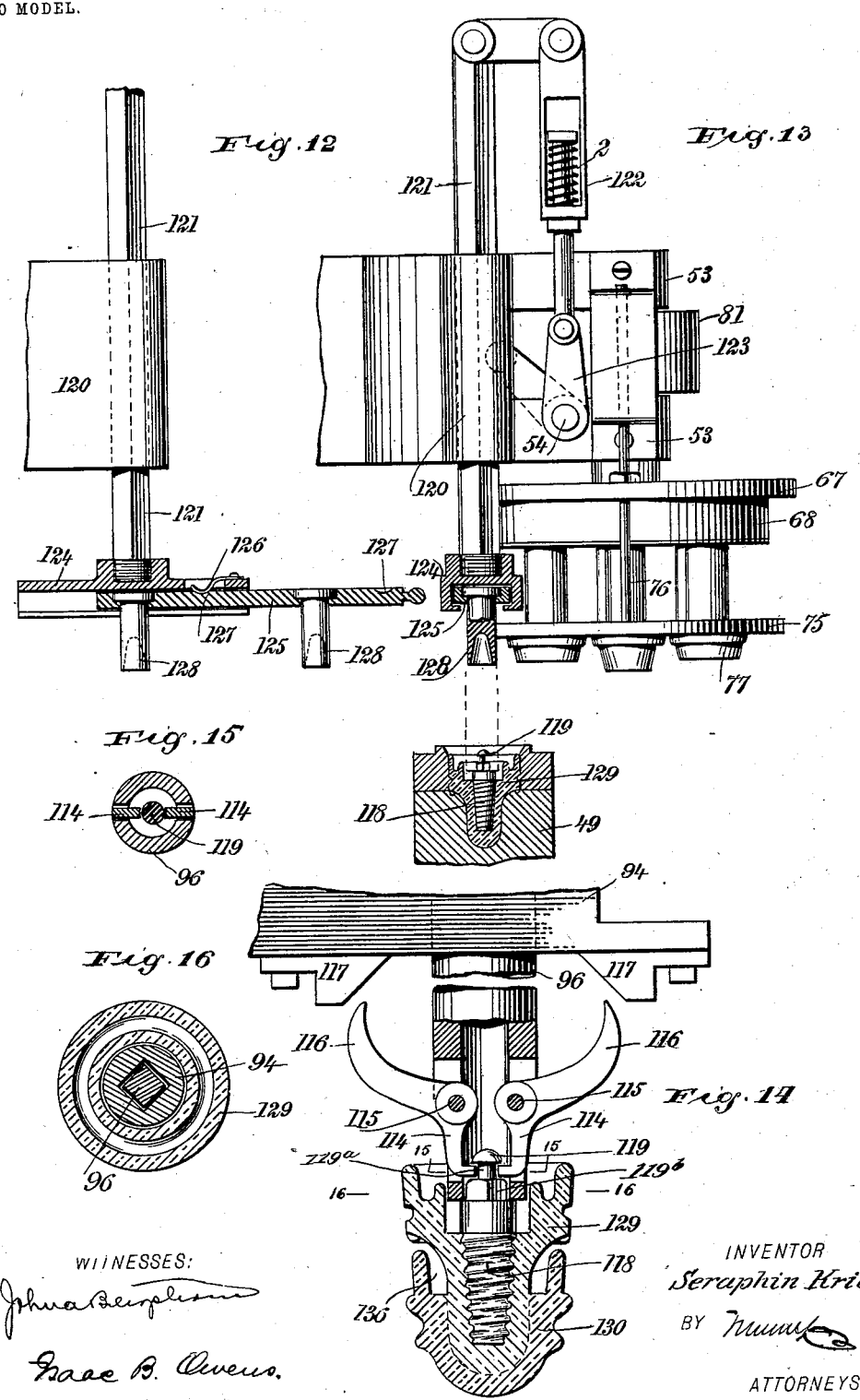
WITNESSES:
INVENTOR
Seraphin Kribs
BY
ATTORNEYS.

No. 730,665. PATENTED JUNE 9, 1903.
S. KRIBS.
GLASS MOLDING MACHINE.
APPLICATION FILED AUG. 23, 1902.
NO MODEL. 6 SHEETS—SHEET 6.
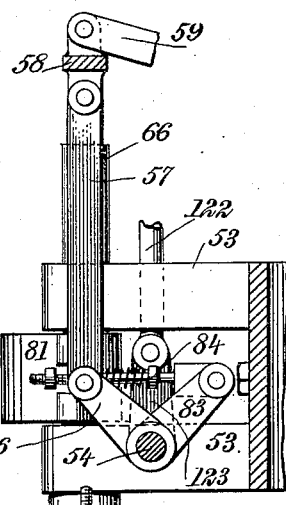
Fig. 17
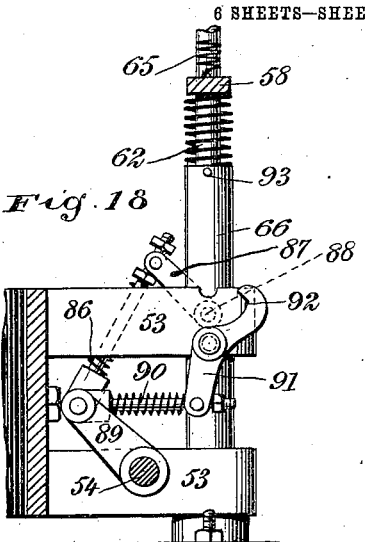
Fig. 18
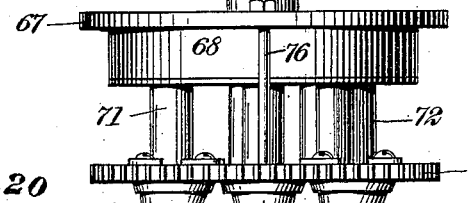
Fig. 20
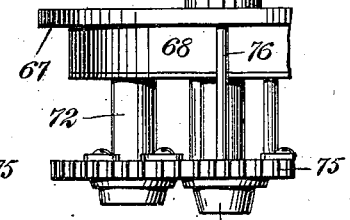
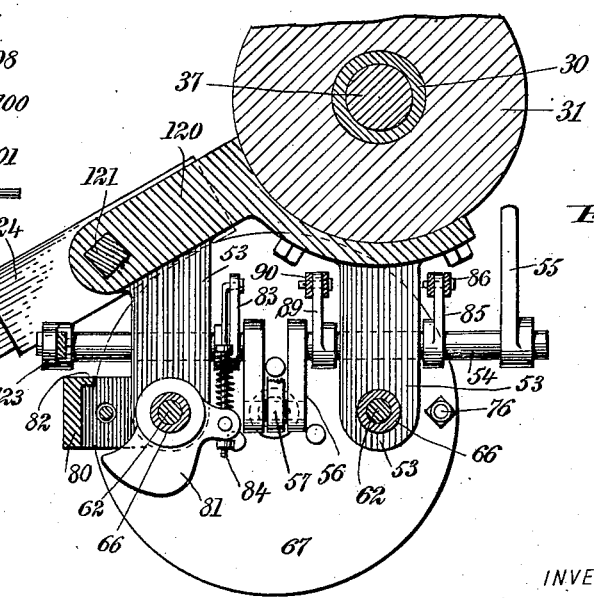
Fig. 19
WITNESSES:
INVENTOR
Seraphin Kribs
BY
ATTORNEYS.

No. 730,665. Patented June 9, 1903.

UNITED STATES PATENT OFFICE.

SERAPHIN KRIBS, OF NEW YORK, N. Y.

GLASS-MOLDING MACHINE.

SPECIFICATION forming part of Letters Patent No. 730,665, dated June 9, 1903.

Application filed August 23, 1902. Serial No. 120,742. (No model.)

*To all whom it may concern:*

Be it known that I, SERAPHIN KRIBS, a citizen of the United States, and a resident of the city of New York, borough of Brooklyn, in the county of Kings and State of New York, have invented a new and Improved Glass-Molding Machine, of which the following is a full, clear, and exact description.

This invention relates to a machine intended especially for molding glass insulators for electrical wires. It will be apparent, however, that the machine could be adapted by a skilled mechanic to other work.

One of the leading features lies in that construction and arrangement of parts which enables a double insulator to be formed—which is to say, an insulator carrying two wires and of such formation that a reëntrant cavity lies between the two wires, thus effectively to prevent short-circuiting the wires from sleet or rain.

Another important feature lies in the means for handling the core employed to mold the threads on the interior of the insulator, by which means the core is pressed into the glass and withdrawn by a turning movement, so as to prevent stripping the threads.

A further important feature lies in the arrangement of a plurality of molds and an equal number of plungers in such a manner that the plungers work successively with the molds, and time is thus given to cool the parts.

A further feature lies in an improved manner of counterbalancing the plunger-head and in an automatic latch device for the mold-table, which is worked in conjunction with the said counterbalance.

The invention involves various other features of major or minor importance, all of which will be fully developed in this specification.

In its general form the apparatus comprises a base whereon is mounted the mold-table. Held on the base above the mold-table is the cross-head of the machine, which carries at one end the plungers and their operating mechanism and at the other end the means for bringing together the two sections of the insulator and for withdrawing the threaded core. A large pinion-gear is mounted to turn with the table, coincident to the center thereof, and this gear meshes with a gear on the rotating plunger-head to drive said head. By this means the plungers are rotated and presented successively to the molds as they pass with the mold-table under the plunger-head. The plunger-head is counterbalanced on the cross-head by a weight in the form of a shaft, which passes down through the center of the cross-head, table, and base of the machine, and thus an extremely compact apparatus is provided. The base carries the automatic latch, which allows the table to turn step by step successively to present the molds and which automatically locks and releases the table at the proper points, this mechanism being actuated by the counterbalance-weight of the plunger-head, and through this arrangement I properly time the automatic action of the lock device.

This specification is a specific description of one form of the invention, while the claims define the actual scope thereof.

Reference is to be had to the accompanying drawings, forming a part of this specification, in which similar characters of reference indicate corresponding parts in all the figures.

Figure 2:
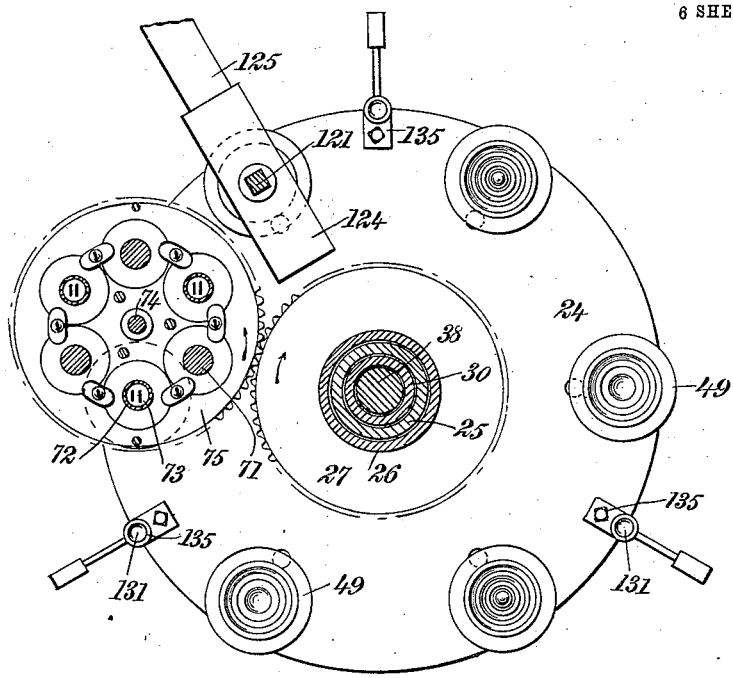
Figure 3:
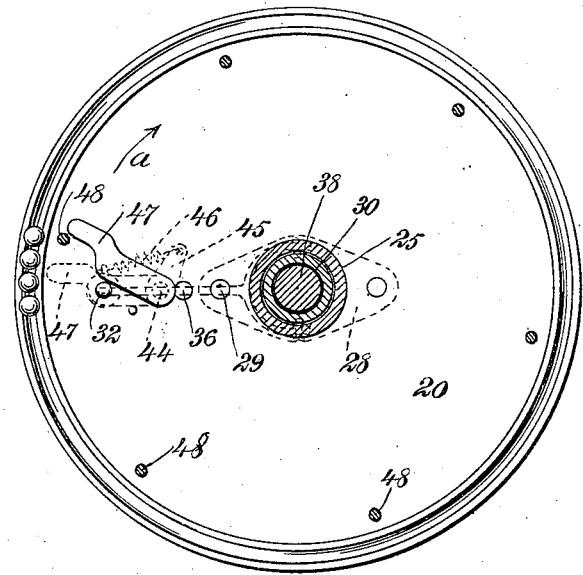

Figure 1 is an elevational view showing the base, table, and molds, with the parts immediately concerned therewith, in section. Fig. 2 is a sectional plan on the line 2 2 of Fig. 1. Fig. 3 is a sectional plan on the line 3 3 of Fig. 1. Fig. 4 is an enlarged sectional view through the plunger-head and the parts immediately concerned therewith, said view showing the plunger-head in raised position. Fig. 5 is a similar view, excepting that the plunger-head is shown lowered and the core-screw is illustrated in the act of pressing out the glass forming the inner or lower section of the insulator. Fig. 6 is a fragmentary view showing the plunger-head raised and illustrating the action of the parts in forming the outer or top section of the insulator. Fig. 7 is a like view showing the plunger-head lowered and the parts active to form the outer section of the insulator and also illustrating the action of the device for picking up the threaded core, which is used on the inner or lower section of the insulator. Fig. 8 is a detail section illustrating the manner of fitting the parts of the plunger-head. Fig. 9 is a sectional plan on the line 9 9 of Fig. 7. Fig. 10 is a sectional plan on the line 10 10 of Fig. 7. Fig. 11 is a sectional plan on the line 11 11 of Fig. 7. Fig. 12 is a detail section showing particularly the slide with the caps thereon for engaging the core-screw and holding it in proper position in the soft glass. Fig. 13 is a view illustrating the plunger-head and showing the said slide and caps in section, this view also illustrating one of the molds in which is formed the inner section of the insulator. Fig. 14 is an enlarged view showing the insulator in section and illustrating the devices for handling the inner or lower section of the insulator and for removing the core-screw. Fig. 15 is a section on the line 15 15 of Fig. 14. Fig. 16 is a section on the line 16 16 of Fig. 14. Fig. 17 is a view of the plunger-head and the means for mounting it, said view illustrating particularly the plunger-actuating shaft and the cranks thereof and being partly in section on the line 17 17 of Fig. 4 and looking to the left from said line, the plunger-head being shown in elevation. Fig. 18 is a similar view, excepting that the line of vision is rightward from the line 17 17 of Fig. 4. Fig. 19 is a sectional plan taken just above the actuating-shaft of the plunger-head; and Fig. 20 is an elevation, with parts in section, showing the screw-machine or the device for handling the inner insulator-section and removing the screw-core therefrom.

20 indicates the base, which, as here shown, is sustained on wheeled legs 21 and has an inwardly-disposed marginal flange 22, on which run the bearing-balls 23 of the mold-table 24. The base has a centrally-disposed and upwardly-projecting tubular extension 25. This tubular extension 25 centers the table 24 on the base, and said table has a like extension 26, lying outside of the extension 25 and turning with the table. On this extension is fastened a pinion-gear 27. Secured within the tubular extension 25 of the base 20 by means of a cross-head 28 and tie-rods 29 is a tube 30, which is thus held rigid with the base and which extends up above the gear 27, said tube carrying at its upper end the cross-head 31 of the machine.

32 indicates the latch-bar for the mold-table, said bar sliding vertically in a bearing in the base 20 and having connection by a link 33 with a lever 34, which lever in turn is fulcrumed on a link 35, connected with a rigid arm 36, depending from the base.

37 indicates the counterbalance-shaft, which extends through the central tube 30 and is loose therein to counterbalance the plunger-head and its mechanism, as will be fully described hereinafter. Two collars 38 are fastened on the lower portion of this counterweight-shaft, and sliding between these collars is a collar 39, wherewith is engaged a fork and pins 40 on the lever 34.

41 indicates a spring which bears between the collar 39 and the upper collar 38 and tending to throw up the latch-bar 32, and 42 indicates a counterweight on the lever 34, acting the same as the spring 41. The table 24 is formed with openings 43 therein, said openings being one for each mold, and into these openings the latch-bar 32 enters, as shown in Fig. 1, whereby to hold the table in proper position.

Mounted to rock in the base alongside of the latch-bar 32 is a shaft 44, which extends below the base, and a crank 45 thereon, whereto is connected a spring 46, attached to a suitable part of the base and tending to turn the shaft 44 in its bearings. The upper end of this shaft 44 carries at a point just under the table 24 a stop-plate 47, which is thrown by the action of the spring 46 into position over the latch-bar 32 and which when in such position prevents the latch-bar from raising into engagement with the mold-table. Fastened to the under side of the mold-table and one for each mold and opening 43 thereof are a number of pins 48. The said stop-plate 47 is in the path of these pins. The mold-table is intended to move with respect to the base in the direction of the arrow $a$ in Fig. 3. The elements 40 and 42 act to throw the latch-bar up; but when the plate 44 is over the latch-bar it is held inactive thereby. As the table is turned one of the studs or pins 48 hits the stop-plate 47 and throw the same into the position shown by full lines in Fig. 3. The latch 32 is then free to enter the opening 43, lying over it, and the table is thus locked in place. This position continues until the plunger-head is brought down onto the mold which is in position beneath it. When the plunger is engaged with the mold, the former will effectually lock the latter, and the lock device is therefore unnecessary. It is at this period that the lock device is released. With the descent of the plunger-head the counterweight-shaft 37 is raised, the lower collar 38 strikes the collar 39, the lever 34 is thrown down at its outer end, and the bar 32 is retracted. Instantly that this is done the stop-plate 47 swings over the latch-bar, and said bar is held inactive until the table 24 is again turned and a second stud 48 hits the stop-plate, throwing it off the latch-bar and allowing the elements 41 and 42 to return the bar 32 to active position. In connection with the weight 42 and spring 41 it is pointed out that immediately the shaft 37 starts upward the tension of the spring 41 is relaxed; but it is not desired at this period to allow the bar 32 to be withdrawn. Hence the weight 42 is provided to hold the latch-bar 32 operative until the plunger-head is near its lowermost position, when the lower collar 38 strikes the fork 40, and the latch-bar 32 is thereupon withdrawn. The instant that the upward movement of the plunger-head takes place the engagement between the lower collar 38 and the collar 39 is broken, and then the weight 42 becomes operative to hold the bar 32 in readiness to act. This is followed a moment later by the reinforcing pressure of the spring 41, which takes place as the plunger-head assumes its raised position. The operation on one mold being complete, it then becomes necessary to turn the table to position the other mold. When this is done, the next pin 48 hits the stop-plate 47 and the above-described operations are repeated.

49 indicates the molds, which may be of any construction desired. As here shown, there are six of these molds mounted at equidistant points around the circumference of the table 24. These molds are mounted on mold-bases 50, said bases having pins 51 thereon to center the molds, and 52 indicates a screw or other fastening for holding the mold secure. By this construction the molds may be readily and exactly positioned on the table and the interchange of molds is greatly facilitated.

At the left-hand end (see Fig. 1) of the cross-head 31 are formed two pairs of bearings 53, the members of which are spaced apart one above the other and said pairs of bearings lying in the same horizontal plane. In the lower bearings 53 is arranged the actuating-shaft 54 of the plunger-head and its mechanism, (see Figs. 17 and 19,) said shaft having at one of its ends the hand-lever 55, by which the shaft is thrown. This shaft is arranged to rock, and it carries a double crank 56, to which is connected a link 57, jointed to a cross-head 58. Said cross-head has sliding connection with a lever 59, fulcrumed on an arm 60, rising from the main cross-head 31. Said lever 59 is joined by a chain 61 to the upper end of the counterweight-shaft 37.

62 indicates two vertical rods whereon are fastened collars 63. These rods 62 pass loosely through the cross-head 58, and the collars 63 are engaged with the top thereof. Cross-arms 64 are connected with the upper extremities of the rods 62, and retractile springs 65 are connected to the cross-head 58 and arms 64, these springs tending to hold the collars 63 engaged with the cross-head 58. The rods 62 extend loosely through tubular shafts 66, which are, as the rods 62, disposed vertically and which slide freely in the respective pairs of bearings 53. It is by these means that the plunger-head is mounted. The rods 62 and tubular shafts 66 project below the lower bearings 53, and said shafts carry rigidly the plunger-head 67. This head is in the form of a horizontally-disposed disk. The lower ends of the rods 62 carry rigidly a circular bearing-head 68, which has a downward and inwardly-disposed peripheral flange 69, in which is arranged to turn a disk 70, carrying the plungers 71 and the tubes 72, in each of which latter are arranged two spring gripping-fingers 73. These fingers 73 have their upper ends fastened closely together in the upper ends of the tubes 72 and thence extend downward, their free ends being curved downward and inward toward each other, as shown best in Fig. 4. The purpose and operation of these fingers will be fully described hereinafter. Said tubes have internal shoulders 72ª at or near their lower ends, the purpose of which will also be hereinafter described. A centrally-disposed hanger-shaft 74 is carried rigidly in the plunger-head 67 and extended loosely through the head 68 and disk 70. Mounted to turn on the lower end of this hanger-shaft is a spur-gear 75, which is in mesh with the pinion 27. (See Fig. 1.) 76 indicates stop-rods which are carried by the plunger-head 67 and project downward, loosely engaging the top of the gear 75 when said gear is raised and limiting the upward movement thereof, these stop-rods also assisting in pressing down the mold-caps or followers 77 when the plungers are at work. These mold-caps or followers 77 are of the same number as the molds and plungers, (in the present construction 6,) and they are carried rigidly in the gear 75, said followers or caps being designed to bear down on top of the molds when the plungers are at work. (See Figs. 5 and 7.) In connection with this construction it will be observed that the plunger-head 67 being carried by the tubular shafts 66 and the bearing-head 68 being carried by the rods 62 said bearing-head and the plungers attached thereto have a movement downward independently of the plunger-head. It will also be observed that the gear 75 is free to rotate on the hanger-shaft 74, carrying with it the parts 77, 71, 72, and 70 independently of the bearing-head 68; also, the bearing-head 68, with the parts 71 and 72, may move longitudinally relatively to the gear 75 and cups 77. Reference to Fig. 2 will show that there are three plungers 71, which alternate between three tubes 72, these plungers and tubes making up the six elements of the plunger-head. When referring generally to the plunger-head and its parts, all of these six elements will hereinafter be considered as "plungers." The gear 27 is vertically elongated, so that it is always in mesh with the gear 75, and consequently whenever the mold-table is turned a corresponding movement is imparted to the gear 75 and from this gear to the disk 70 and the plungers attached.

78 indicates a stop-rod which is attached to the plunger-head 67 and projects upward therefrom through vertically-disposed openings 79, formed in a box 80, which is fastened to the left-hand pair of bearings 53. (See Figs. 4 and 5.) Mounted to swing loosely on the adjacent shaft 66 is an arm 81, which is essentially in the form of an elbow-lever and which is capable of having one end thrown into the box 80, so as to lie over the rod 78 when said rod is lowered, and thus hold the rod down. This also holds down the plunger-head and through the medium of the rods 76 the gear 75. (See Fig. 5.)

82 indicates a stop in the box 80, which limits the inward movement of the lever 81. When the lever 81 is thrown into the position shown in Fig. 19, the rod 78 is free to move up and down; but when the lever is thrown into the position shown in Fig. 5 the rod is locked in its lowered position. The said lever 81 is operated automatically from the shaft 54 by means of a crank 83 on said shaft and a spring-and-rod connection 84 between said crank and the lever.

Fastened to the shaft 54 is a crank 85, which is joined to an arm 87 by a link and spring 86. Said arm 87 is fastened to a screw 88, which is threaded in one of the bearings 53 and is arranged to engage the adjacent hollow shaft 66. When the shaft 54 is rocked to throw down the plunger-head, the parts 85 86 87 turn the screw 88, and said screw is caused to impinge against the adjacent shaft 66, thus locking said shaft in its lowered position. When the shaft 54 is rocked backward to raise the plunger-head, the screw 88 is released.

89 indicates a crank on the shaft 54. This crank is connected by a spring and rod 90 (see Fig. 18) with a lever 91, having a hook 92 at its upper end. This hook is adapted to engage a pin 93, fastened to the upper end of the adjacent hollow shaft 66 when said shaft is thrown down to its lower position. (See Fig. 5.) As the shaft 54 is rocked to move down the plunger-head the parts 89, 90, and 91 act to throw the hook 92 over the pin 93 when said pin reaches its lowermost position. These devices act in conjunction with the screw 88, and either one or both may be employed, as desired.

As best shown in Fig. 19, one of the pairs of bearings 53 is carried on an arm 120, and in this arm moves vertically a square or other angular shaft 121. Said shaft is connected by a spring-jointed link 122 with a crank 123, fastened on the shaft 54, so that as said shaft is rocked the shaft 121 is raised or lowered. The lower end of the shaft 121 carries a guide 124, in which works a slide 125. 126 indicates a spring-catch adapted to engage cavities 127 in the slide 125, thus to hold the slide releasably in either one of two positions. The slide 125 carries two or more caps 128, which project downward therefrom. As the crank 123 turns downward it brings with it the shaft 121, and, as shown in Fig. 13, this shaft is located directly over the line of molds, so that when one of the caps 128 is brought down its recessed lower end incloses the top of the core-screw, and thus steadies the screw and prevents the same from inclining or capsizing while the glass is soft. When the crank 123 rocks back, the slide 125, with its attached parts, is returned to the raised or inactive position. A plurality of caps 128 is provided in order that when one becomes hot it may be moved out of the way and a cold cap placed in position.

At the opposite end of the main cross-head 31 are formed two bearings 94 and 95. In these bearings is mounted to turn and to slide a shaft 96. Surrounding said shaft and turning on the lower bearing 94 is a gear 97, which is splined on the shaft 96, so that the shaft may slide freely through the gear, but must turn therewith.

98 indicates a gear meshing with the gear 97 and carried on a shaft 99, which is mounted to turn in one of two bearings 100, located between the bearings 94 and 95. 101 indicates a hand-wheel on said shaft 99, whereby to turn the shaft. In the other bearing 100 is mounted a shaft $99^a$, on which a sleeve 102 is loosely mounted, this sleeve carrying a hand-wheel 103 and a sprocket-wheel 104. Over the wheel 104 runs a chain 105, which also runs over a sprocket 106, fastened on a shaft 107, mounted in the bearing 95. Said shaft 107 carries a worm-gear 108, and this gear is in mesh with threads of a corresponding pitch formed on the shaft 96 and indicated at 109 in the drawings. When the wheel 103 is turned, the shaft 107 is driven revolubly, and the gear 108, working with the threads 109, acts as an ordinary pinion, while the threads act as a rack, and the shaft 96 may thus be moved axially up or down. When the wheel 101 is turned, the gears 98 and 97 cause the shaft 96 to be revolved. The threads 109 then acting on the worm-wheel 108 transform this wheel into a nut, and the shaft 96 screws itself upward at the same time that it is turning. The gear 108 will not revolve during this operation, owing to the friction attending the movement of the parts 107, 106, 105, 104, and 102. The object of imparting to the shaft 96 a combined reciprocal and turning movement is to enable it to withdraw the threaded core from the insulator, the glass of which has been molded around the threads. 110 indicates a counterweight which slides on rods 111, extended up from the bearing 95, and this counterweight is connected by chains 112 with the shaft 96, said chains passing over sheaves 113, mounted on the upper end of the guides 111.

As best shown in Fig. 14, the lower end of the shaft 96, below the bearing 94, carries two dogs 114. These dogs are pivoted at the points 115 and have cam-like extensions 116, adapted to strike abutments 117, formed on or fastened to the lower side of the bearing 94. The lower end of the shaft 96 is formed with an angular recess, so that the square or angular upper portion $119^b$ of the core-screw may be received therein to prevent the screw from turning independently of the shaft.

118 indicates a core-screw, and 119 the head thereon. The pitch of the threads on the wheel 108 is the same as the pitch of the threads on these cores. The heads 119 of the screws 118 are joined by necks $119^a$ to the angular upper ends or portions $119^b$ of the screws. The dogs 114 are active by gravity and engage the head of the core-screw in the manner shown, so that said screw and the insulator, if attached thereto, may be raised or lowered with the shaft 96. When the shaft 96 is raised to the limit of its upward movement and the extensions 116 strike the abutments 117, said extensions will be thrown inward and the dogs 115 will release the screw 118.

129 indicates the lower or inner section of the insulator, and 130 indicates the upper or outer section.

The operation of the apparatus may be traced as follows: The screw-cores 118 are floating parts in the machine, and for each machine a sufficient number will be provided to enable the operation to be carried on continuously and conveniently. I provide a number of cups for handling these cores. Said cups are indicated at 131. (See Figs. 2, 6, and 7.) The cups are each provided with a handle 132 and a stem 133, around the upper part of which stems springs 134 are coiled and attached to the bases of the cups. Mounted on the mold-table 24 are three holders 135 for the cups 131, these holders being vertically recessed to receive the stems 133 in the manner indicated in Figs. 6 and 7. The holders 135 are arranged at equidistant points on the periphery of the table. The cups are adapted to be handled by one of the boys employed in operating the machine, and when the shaft 96 (see Fig. 14) is raised and the dogs 114 release the core-screw the boy should hold one of the cups 131 under the screw, so that the screw will drop thereinto. This screw being hot should then be laid aside and a cold screw taken from a bench or any other suitable support adjacent to the machine (said support not being illustrated) and the cold screw placed in the cup, after which said cup should be mounted on the proper holder 135. When the plunger-head is in the adjustment shown in Fig. 7 and is lowered to press one of the plungers into the appropriate mold to form the outer insulator-section 130, the tube 72, diametrically opposite said operating-plunger, moves down over the core-screw 118 in the cup 131 which is next adjacent to the mold above referred to, and the peculiarly-shaped lower ends of the spring-fingers 73 then spread over and grip the head 119 of the screw 118, the round upper portion of the screw (just below the angular part 119$^b$) striking against the interior shoulder 72$^a$ of the tube 72. When the plunger-head rises, said screw is carried up with the said tube 72, the table and plunger-head having been rotated, and the parts assume the position shown in Fig. 4. The spring 134 is provided to yieldingly support the screw when it is engaged by the spring-fingers 73.

In Fig. 14, where the complete insulator is illustrated, it will be observed that the section 129 is pressed into the section 130. This is done when the glass is in a sufficiently plastic state to cause a homogeneous juncture of the two parts. In the said figure I have illustrated a broken line between the two parts of the insulator in order to bring out the idea clearly; but in practice this line will not appear. It will also be observed that owing to the form of the two sections the complete insulator has a reëntrant annular space 136 between the sections, said space forming a division between the sections and preventing water, sleet, or other conducting or semiconducting substances from extending from one section to the other, and thus short-circuit the two wires which may be hung on the insulator. In connection with Fig. 14 I will point out that the shaft 96 is shown broken in this view and the parts 129, 130, 118, and 114 are shown in the position which they occupy when the molding operation has been completed. As will be hereinafter pointed out, the completed insulator is not lifted out of the mold by the return movement of the shaft 96. This return movement serves only to unscrew the core 118.

It will be observed by reference to Fig. 1 and to other views of the drawings that the molds 49 are of two classes—namely, one suited to the section 130 of the insulator and one suited to the section 129. These molds are arranged alternately on the mold-table. The first operation is to place a mass of glass in the mold forming the section 130, as indicated in Fig. 6, the plunger-head being raised. Assuming that this has been done and that the table is locked in position, with the said filled mold under one of the plungers 71 of the plunger-head, the shaft 54 should then be rocked and the plunger-head brought down into the position shown in Fig. 7. The follower 77 above said mold will be forced down on top thereof, and then the plunger 71 will move independently of the follower downward into the glass to press it out and form the mold-section 130. (Shown in Fig. 7.) Simultaneously with this operation the tube 72, diametrically opposite the operating-plunger 71, will descend upon one of the cups 131, which is placed in the holder 135 adjacent to the operating-mold, and the spring-fingers 73 will grasp the head of the core-screw 118. When the molding operation has been performed, as above explained, and the plunger-head is raised, the plunger 71 moves out of the glass in the mold and the tube 72 rises, carrying with it the screw 118. The workman now turns the table to move a second mold into position under the plunger-head, this operation being allowed by the automatic action of the latch 32, as before explained. The movement of the table 24 involves a corresponding movement of the plunger-head, and the parts of the plunger-head are turned from the relative position shown in Fig. 6 and 7 to that shown in Figs. 4 and 5—which is to say, one of the tubes 72, carrying a screw 118, will be in position directly over a mold adapted to form the inner section 129 of the insulator. A quantity of glass is placed in the mold, as Fig. 4 illustrates, and then the plunger-head is brought down into the position shown in Fig. 5. The corresponding follower 77 closes the top of the mold, and the continued movement of the bearing-head 68 presses down the tube 72, which carries with it the screw 118 and forces it into the glass, causing the inner section 129 of the insulator to be molded, the glass of this section being pressed around the threads of the screw-core 118. When this has been done, the plunger-head is again raised and the spring-fingers 73 release the screw 118, leaving said screw embedded in the insulator-section 129. The table 24 is again advanced to bring a third mold into position, this mold being one adapted to form a section 130 of the insulator. The glass is placed in the said third mold and the plunger-head is thrown down for a third time, the parts then being in the position shown in Fig. 6. As the plunger-head is thrown down the elements 123 and 122, actuated from the shaft 54, throw down the shaft 121 and the guideway 124. This causes one of the caps 128 to be moved down on top of the core-screw 118, which has just been left by the above-mentioned second operation of the plunger-head. Said cap 128 serves to reposition the screw should it have fallen from the true vertical position and to hold the screw upright until the glass becomes sufficiently hard to maintain the screw properly. The shaft 121 is lowered with each depression of the plunger-head; but of course when a mold having a section 130 of the insulator comes under the shaft 121 the devices of said shaft 121 are inactive. The mold-table is adapted to be turned around with a step-by-step movement in the direction of the arrow $a$ in Fig. 3, as before described, and as soon as one of the mold-sections 129, with a screw 118 embedded therein, arrives at a position under the shaft 96 the wheel 103 should be turned to throw down said shaft 96 and cause the dogs 114 to engage the head 119 of the said screw-core 118. When this has been effected, the wheel 103 should be turned in a reverse direction and the shaft 96 moved upward. The shaft 96 in thus moving upward carries with it the screw 118 and the insulator-section 129, wherein said screw is embedded, the parts then assuming the position shown in Fig. 1; but care should be taken to stop the shaft 96 below the abutment-cams 117, so as to prevent dropping the core-screw and insulator-section. These parts 118 and 129 are then left suspended until the table 24 is turned to advance a second mold, and this second mold will be one adapted for and containing a section 130 of the insulator. As soon as this second mold stops under the shaft 96 the wheel 103 should again be turned to lower the shaft, and the previously-suspended section 129 of the insulator is forced down into the insulator-section 130.

The various operations above described will take place successively and rapidly, and the glass of the two sections 129 and 130 which are thus engaged will be sufficiently hard to retain its shape in the mold and on the screw 118, but will at the same time be sufficiently soft or plastic to facilitate pressing the two sections together and forming a homogeneous mass. When the shaft 96 is lowered, the parts 118, 129, and 130 assume the position shown in Fig. 14, and the formation of the insulator will then be complete. It now remains to remove the screw 118 from the insulator and to remove the completed insulator from the mold. The former operation is performed by turning the wheel 101, which through the medium of the gears 98 and 97 imparts a rotary movement to the shaft 96, and said shaft acting as a screw on the element 108, which is then transformed into a nut, will be raised by a combined turning and axial movement, which results in the unscrewing of the screw-core from the insulator. This upward movement of the shaft is continued until the dogs 114 strike their extensions 116 against the abutment-cams 117, and the screw is then released from the dogs. When this release of the screw takes place, one of the attendants should hold a cup 131 under the screw, so as to catch the same. This attendant should also keep the various holders 135 supplied with cold screws 118, placed in their cups 131, after the manner illustrated in Figs. 2, 6, and 7. The molds are of course formed of hinged or otherwise independently-movable sections and should be opened in the usual manner, so that the insulator may be manually removed therefrom.

In the practical operation of the apparatus a glass-molder and two "boys" will be employed. The glass-molder will stand at the plunger-head and will operate the lever 55. One boy will operate the shaft 96 through the medium of the wheels 101 and 103, and the other boy will handle the screw-cores 118, which, as before described, float through the machine, and will also open the molds and remove the finished product therefrom. This, however, is not a matter directly concerned with this specification.

Various changes in the form, proportions, and minor details of my invention may be resorted to without departing from the spirit and scope thereof. Hence I consider myself entitled to all such variations as may lie within the scope of my claims.

Having thus described my invention, I claim as new and desire to secure by Letters Patent—

1. A glass-molding machine, comprising a base, a table movable thereon, a latch for the table, means for operating the latch, and a stop mounted on the base and operated from the table, said stop being movable over and from the latch, for the purpose specified.

2. In a glass-molding machine the combination of a base, a table movable thereon, a latch working with the table for the purpose specified, means for operating the latch, a stop-plate movable over the latch releasably to hold the same, and means carried by the table periodically to actuate the stop-plate.

3. The combination of a base, a table mounted to turn thereon, a latch-bar vertically movable in the base, means tending to hold the latch-bar in engagement with the table, a stop-plate movable over the latch-bar to hold it inactive, and a pin carried by the table and adapted to strike the stop-plate to disengage it from the latch-bar.

4. A glass-molding machine comprising a table, a latch therefor, plunger mechanism, a counterweight for the plunger mechanism, and connections between the counterweight and the latch for the purpose specified.

5. A glass-molding machine comprising a base, a table mounted to turn thereon, a latch-bar movable in the base toward and from the table for the purpose specified, means for operating the latch-bar, a rock-shaft mounted in the base, a stop-plate carried by the rock-shaft and adapted to move over the latch-bar to hold it inactive, means pressing the rock-shaft to throw the stop-plate normally over the latch-bar, and a device carried by the table and serving to engage the stop-plate and move it out of engagement with the latch-bar.

6. A glass-molding machine comprising a table or supporting member, a mold-base mounted thereon and having a pin projecting upward therefrom, a mold having an opening to receive the pin, said mold resting removably on the mold-base, and means eccentric to the pin for holding the mold in place.

7. A glass-molding machine comprising a table or supporting member, a mold-base mounted thereon and having a centrally-disposed upwardly-projecting pin, a mold having a central opening removable to receive said pin, and a fastening-screw eccentric to the pin for removably fastening the mold to the mold-base.

8. A glass-molding machine comprising a revoluble table, molds carried thereon, a gear turning in time with the table, plungers working with the molds, and means carrying said plungers to turn bodily, and comprising a gear through which the plungers move, the second-named gear being directly meshed with the first-named gear.

9. A glass-molding machine comprising a revoluble table, molds carried thereon, a gear turning in time with the table, plungers working with the molds, means carrying said plungers to turn bodily, and a gear connected with the plungers and meshed with the first-named gear, the plungers and second-named gear being movable toward and from the molds and the first-named gear being elongated in the direction of the movement of the plungers, whereby to prevent disengagement of the gears.

10. In a glass-molding machine the combination of a base, a vertically-disposed shaft mounted on the base, a table arranged to turn around the center of said shaft and having an upwardly-projected tubular extension, plungers and plunger-operating mechanism supported on the said shaft of the base and comprising means permitting the rotation of the plungers, a gear in connection with the plungers, and a gear mounted on the tubular extension of the table and meshed with the first-named gear.

11. In a glass-molding machine the combination of a base, a vertically-disposed shaft mounted on the base, a table arranged to turn around the center of said shaft and having an upwardly-projected tubular extension, plungers and plunger-operating mechanism supported on the said tubular shaft of the base and comprising means permitting the rotation of the plungers, a gear in connection with the plungers, and a gear mounted on the tubular extension of the base and meshed with the first-named gear, the said plunger mechanism being movable toward and from the molds, and the second-named gear being elongated in the direction of said movement to prevent disengagement of the gears.

12. A glass-molding apparatus having a base with a tubular extension projected upward from the center thereof, a table arranged to turn around said extension and having a similar extension projecting upward, a gear fastened on the extension of the table, a shaft fastened to the base and extending through the said upward extension thereof, a cross-head carried at the upper portion of the shaft, plungers and plunger-operating mechanism sustained on said cross-head and comprising means permitting the plungers to rotate, and a gear connected with the plungers and meshed with the first-named gear to rotate the plungers in unison with the table.

13. A glass-molding apparatus having a base with a tubular extension projected upward from the center thereof, a table arranged to turn around said extension and having a similar extension projecting upward, a gear fastened on the extension of the table, a shaft fastened to the base and extending through the said upward extension thereof, a cross-head carried at the upper portion of the shaft, plungers and plunger-operating mechanism sustained on said cross-head and comprising means permitting the plungers to rotate, and a gear connected with the plungers and meshed with the first-named gear to rotate the plungers in unison with the table, the plunger mechanism being movable vertically toward and from the molds, and the first-named gear being vertically elongated to permit the engagement of the gears irrespective of the movement of the plunger mechanism.

14. A glass-molding machine comprising a table arranged to turn, a plurality of molds mounted thereon, a plurality of plungers adapted to work respectively with the molds, rotating means carrying the plungers to move bodily around an axis at one side of the axis of the rotating table, and devices connecting the plunger-carrying means and the table, to turn the two in unison.

15. A glass-molding machine comprising a table arranged to turn, a plurality of molds mounted thereon, a plurality of plungers adapted to work respectively with the molds, means for carrying the plungers to rotate, and devices for rotating the plungers in unison with the turning of the table, said means including gears respectively connected with the plungers and with the table and meshed with each other.

16. A glass-molding machine comprising a mold, means carrying the mold, a plunger working with the mold, a counterweight for the plunger, said counterweight being vertically elongated and being passed through the central portion of the machine, and a latch device for the mold-carrying means, said latch device having connection with the counterweight to be actuated therefrom.

17. A glass-molding apparatus comprising a mold, means for carrying the mold, a latch for said means, a plunger, a counterweight for the plunger, and a connection between the latch and counterweight for the purpose specified.

18. A glass-molding machine comprising a base, a mold-table arranged to turn thereon, a tubular shaft passing upward from the base through the center of the mold-table, plunger mechanism supported on the tubular shaft, and a vertically-elongated counterweight-shaft movable freely in the said tubular shaft.

19. A glass-molding machine comprising a base, a mold-table arranged to turn thereon, a tubular shaft passing upward from the base through the center of the mold-table, plunger mechanism supported on the tubular shaft, a vertically-elongated counterweight-shaft movable freely in the said tubular shaft, said counterweight-shaft extending below the base, a latch for the mold-table, and a connection between the latch and the lower end of the counterweight-shaft.

20. A glass-molding machine comprising a base, a table arranged to turn thereon, plunger mechanism sustained from the base above the table, a counterweight-shaft for the plunger mechanism, the said shaft extending downward below the base, a latch for the mold-table, a lever in connection with the latch, a collar loose on the counterweight-shaft and having connection with the lever, additional collars fast to the counterweight-shaft at opposite sides of the first-named collar, and means for exerting a tension on said lever.

21. In a glass-molding machine, the combination of a base, a mold-table arranged to turn thereon, plunger mechanism working with the mold-table, a latch for the mold-table, and connections between the latch and the plunger mechanism, said connections releasing the latch as the plunger mechanism engages the mold.

22. In a glass-molding machine, the plunger mechanism comprising the combination of a plunger-head, a bearing-head, means for carrying the same to be independently movable, a disk mounted to turn in the bearing-head, a plunger carried thereby, and a member sustained from the plunger-head and through which member the plunger is movable, said member turning with the disk and plunger.

23. In a glass-molding machine, the plunger mechanism comprising the combination of a plunger-head, a bearing-head, means for carrying said parts to be independently movable, a disk arranged to turn in the bearing-head, a plunger carried by the disk, a hanger-shaft depending rigidly from the plunger-head and passing through the bearing-head and disk, a gear mounted to turn on the hanger-shaft, a follower or mold-cap carried in the gear, a plunger attached to the disk and movable through the follower or mold-cap, and means for rotating the said gear, plunger and disk.

24. In a glass-molding machine, the combination with the supporting-frame, of a plunger-head and plunger, means for moving the same, a stop-rod in connection with the plunger-head, a box in which said rod is movable, and an arm mounted to swing and having connection with the means for moving the plunger-head, the said arm being movable over the stop-rod when the plunger-head is in active position.

25. In a glass-molding machine, the combination with the supporting-frame, of a plunger-head and plunger, means for moving the same, a lock device for holding the plunger-head in operative position, and a connection between the lock device and the means for moving the plunger for the purpose specified.

26. In a glass-molding machine, the plunger mechanism comprising a tubular shaft, a shaft movable therethrough, said shafts being in connection respectively with parts of the plunger mechanism, a cross-head sliding on the second-named shaft, a spring-bearing between the cross-head and the first-named or tubular shaft, a second spring connecting the cross-head and the second-named shaft, and means for operating the cross-head.

27. In a glass-molding machine the combination of the plunger mechanism, means for operating the same, a stop-rod in connection with the plunger mechanism, and a device driven from the means for operating the plunger mechanism, said device serving to engage the stop-rod when the plunger mechanism is active, for the purpose specified.

28. In a glass-molding machine the combination with the mold and with the plunger mechanism, of a slideway mounted to move toward and from the mold in unison with the plunger mechanism, a slide mounted therein, and a plurality of caps carried by the slide for the purpose specified.

29. In a glass-molding machine the combination of the mold, means carrying the mold, plunger mechanism movable toward and from the same, a rock-shaft having connection with the plunger mechanism to drive it, a shaft mounted to slide in unison with the plunger mechanism, a cap carried by the said shaft, a crank on the first-named or drive shaft, and a connection between said crank and the second-named or slide shaft.

30. In a glass-molding machine the plunger mechanism comprising a plunger-head, a bearing-head, means for independently sustaining the two, a member arranged to turn in the bearing-head, a plunger carried by said member, a gear, means mounting the gear to turn and sustaining the gear from the plunger-head, means for driving the gear, and a follower or mold-cap carried by the gear, the plunger being movable through the follower or mold-cap.

31. In a machine for molding glass insulators, the combination with the molds and means for carrying the same, of plunger mechanism comprising plungers proper, core-screw-gripping devices alternately arranged with respect to the plungers, and means for mounting the plungers and gripping devices to turn bodily around a common center.

32. In a machine for molding glass insulators, the combination with the molds and the movable means for carrying the same, of plunger mechanism comprising plungers proper, core-screw-gripping devices alternately arranged with respect to the plungers, means for mounting the plungers and gripping devices to turn bodily around a common center, and a driving connection between the means for carrying the molds and the means for mounting the plungers and grippers to cause said elements to move in unison.

33. A machine for forming duplex glass insulators, comprising molds respectively capable of forming the two insulator-sections, a plunger working with one mold, and a gripping device for the core-screw adapted to work with the other mold.

34. A machine for forming duplex glass insulators, comprising molds respectively capable of forming the two insulator-sections, a plunger working with one mold, a gripping device for the core-screw adapted to work with the other mold, and followers or mold-caps coacting with the plunger and gripping device.

35. A machine for forming duplex glass insulators, comprising a rotating mold-table having molds respectively capable of forming the insulator-sections, said molds being arranged alternately on the table, plungers working with certain of said molds, core-screw-gripping devices working with the other of said molds, means for carrying the plungers and gripping devices, and a driving connection extending between the mold-table and said means for carrying the plungers and gripping devices to turn the plungers and gripping devices in unison with the movements of the mold-table.

36. In a machine for molding glass insulators, the combination with the mold and the complementary molding devices, of a gripper for the screw-core, a threaded shaft carrying the gripper, a threaded member engaged with the threaded shaft, and means for imparting rotary movement to said shaft, the shaft being also axially movable.

37. In a machine for molding glass insulators, the combination with the mold and the complementary molding devices, of a gripper for the core-screw, a threaded shaft connected with said gripper, a gear splined on the shaft, means for turning the gear, a worm-wheel meshed with the threaded portion of the shaft, and means for revolving the worm-gear.

38. In a machine for molding glass insulators, the combination with the mold and the complementary molding devices, of a gripper for the insulator-core, a threaded shaft having connection with the gripper, means for turning the shaft, said means allowing axial movement of the shaft, a worm-wheel meshed with the threaded portion of the shaft, and means for turning the worm-wheel.

39. A glass-molding machine, comprising a revoluble table, molds mounted thereon, a gear turning in time with the table, plungers coacting with the molds, and means carrying said plungers to turn bodily and comprising a gear through which the plungers move, the second-named gear being driven from the first-named gear.

40. A glass-molding machine, comprising a revoluble table, molds mounted thereon, a gear turning in time with the table, plungers coacting with the molds, and means carrying said plungers to turn bodily and comprising a gear through which the plungers move, the second-named gear being driven from the first-named gear, and the means for carrying the plungers being mounted to turn around an axis removed from that of the table.

41. In a glass-molding machine, the combination with the revoluble table and molds mounted thereon, of plunger mechanism comprising plungers proper, screw-core-gripping devices arranged alternately with respect to the plungers, means for mounting the plungers and gripping devices to turn bodily around a common center removed from the center of revolution of the table, and a driving connection between the table and said means for mounting the plungers and grippers, to cause said elements to operate in unison.

42. In a glass-molding machine, the combination of a base, a vertically-disposed shaft held stationary thereon, a table mounted to turn on the base, molds carried on the table, a cross-head mounted on the shaft above the table, a plunger mechanism revolubly mounted on one end of the cross-head, means for revolving said plunger mechanism in time with the movement of the table, and means at the other end of the cross-head for lifting from one of the molds the product thereof.

43. The combination of a base, a vertically-disposed shaft mounted thereon, a table arranged to turn on the base, molds carried on the table, said molds being adapted respectively to mold the separate parts of a two-part article, a cross-head mounted on the said vertical shaft, above the table, plunger mechanism revolubly carried on one end of the cross-head and comprising plungers proper and screw-core-gripping devices, means for rotating said plunger mechanism in unison with the movements of the table, and means at the other end of the cross-head for moving the product of one mold into engagement with the product of the other mold.

44. In a glass-molding machine for forming a two-part article, the combination of two molds constructed respectively to form said two parts of the article, plunger devices respectively working with the molds, means for mounting the molds, means for mounting and operating the plunger devices, and means for transferring from one mold to the other the product of the first mold and pressing said product upon the product of the second mold.

45. The herein-described core-screw for glass-molding machines, comprising the screw proper, an angular part immediately adjacent thereto, a neck projecting from the angular part and a head carried by the neck, substantially as and for the purpose specified.

46. In a glass-molding machine having molds, plungers and complementary molding and operating means, the herein-described devices for carrying the core-screws, comprising a plunger-tube, and two spring-fingers having their upper ends arranged in close proximity to each other and fastened thereat in the upper portion of the plunger-tube, said fingers extending downward and their free lower ends being curved outward and thence inward toward each other, forming grippers to hold between them the head of the core-screw.

47. In a glass-molding machine having molds, plungers and complementary mounting and operating means, the herein-described devices for handling the core-screws comprising a plunger-tube and two spring-fingers mounted at their upper ends in said tube and extending downward, the free ends of said fingers acting toward each other to grip the head of the core-screw between them, said plunger-tube having an internal shoulder adapted to be engaged by the core-screw for the purpose specified.

48. The herein-described core-screw for glass-molding machines comprising the screw proper, an angular part immediately adjacent thereto, a neck projecting from the angular part and a head carried by the neck, said core-screw having a shoulder between the screw proper and said angular part, substantially as and for the purpose specified.

49. A machine for molding glass insulators, comprising the combination with the mold and complementary molding devices, of a vertically-movable member, means for mounting and operating the same, two oppositely-situated intermediately-pivoted dogs each capable at one end of gripping the head of the core-screw, the remaining or upper ends of the dogs being projected from opposite sides of the said vertically-movable member, and two stationary abutments located at opposite sides of the vertically-movable member in position to be struck by the said remaining ends of the dogs automatically to release the screw-core.

In testimony whereof I have signed my name to this specification in the presence of two subscribing witnesses.

SERAPHIN KRIBS.

Witnesses:
 ISAAC B. OWENS,
 JNO. M. RITTER.